UNITED STATES PATENT OFFICE.

747,919

HERMANN PASSOW, OF HAMBURG, GERMANY, ASSIGNOR TO HENRY EDMUNDS, OF LONDON, ENGLAND.

CEMENT AND PROCESS OF MAKING SAME.

SPECIFICATION forming part of Letters Patent No. 747,919, dated December 22, 1903.

Application filed September 3, 1902. Serial No. 122,589. (No specimens.)

*To all whom it may concern:*

Be it known that I, HERMANN PASSOW, a subject of the German Emperor, and a resident of Hamburg, Germany, have invented certain new and useful Improvements in Cement and Processes of Making the Same, of which the following is a specification.

This invention relates to the process of producing the cement from furnace-slag.

My investigations in relation to blast-furnace slag indicate that several modifications of slag material are desirable in order to produce the best quality of cement. The following modifications of slag have been considered: 1. Furnace-slag treated with air and quickly cooled down, so that it has a vitreous structure and shows only an inconsiderable rise of temperature when ground, slightly moistened, compressed into a cake, and treated by a stream of carbon dioxid. 2. Slag-sand—that is, water-granulated slag—dried at a temperature of about 200° centigrade. 3. Furnace-slag treated with air, but cooled down more slowly than said vitreous slag, so that it has a pumiceous structure and shows a considerable rise of temperature when ground, slightly moistened, pressed into a cake, and treated with a stream of carbon dioxid. 4. Roasted slag-sand. These modifications 1 and 2 are both vitreous or inert slag-cement material and seem to be identical in their physical and chemical properties. The modifications 3 and 4 are both pumiceous or active slag-cement material and also seem to have identical physical and chemical properties. The inert material, such as modifications 1 and 2, or the active materal 3 and 4 when tested alone after being ground and moistened does not set or sets so very slowly that it cannot be properly considered a cement. If, however, these inert and active materials are mixed together in suitable proportions by mixing modifications 1 and 3, 1 and 4, 2 and 3, or 2 and 4, a highly-cementitious material is obtained. The setting time of the cement and other properties of the same may also be regulated by mixing with the cement a small quantity of ordinary Portland cement or other cementitious material.

An example of the manner of carrying out the process will now be described in detail.

Water-granulated slag was dried at a temperature of about 200° centigrade and then finely ground, so that it passed through a sieve having nine hundred meshes to the square centimeter, while it left a ten-per-cent. residue on a sieve having five thousand meshes to the square centimeter. This ground material when moistened set only after a number of days and had no strength at all. Pats made therefrom entirely disintegrated after remaining three days under water. The same water-granulated slag was heated to about 1,200° centigrade and then quickly cooled down by means of a jet of air. When this material was ground to the same fineness, it set, after being moistened, in about five and one-half hours and stood the contant-volume test required of good cement. Its strength was, however, very small, as will be seen from the following table showing the tensile strength in kilograms per square centimeter of test-pieces made in the ordinary way with three parts of sand to one of the material, it being understood in all cases that the test-pieces designated as "water-hardened" were allowed to set in air for a day and then were kept under water for the remainder of the time indicated.

|  | 7 Days. | 28 Days. |
|---|---|---|
| Water-hardened | 0 | 5.8 Kg. |
| Air-hardened | 0 | 3.9 Kg. |

Equal parts of this dried water-granulated slag and roasted water-granulated slag were thoroughly mixed after being ground and produced an excellent cement which set in eight hours and which passed the constant-volume test. This cementitious material showed the following tensile strength in kilograms per square centimeter when test-pieces were made as usual with three parts of ordinary sand to one of the material:

|  | 7 Days. | 28 Days. |
|---|---|---|
| Water-hardened | 7.5 Kg. | 16.5 Kg. |
| Air-hardened | 10.4 Kg. | 30.3 Kg. |

Slag was vigorously treated with air, so as to be quickly cooled down. The resulting material when ground and moistened set only after several days. This material when tested as usual with three parts of ordinary sand to one of the slag gave the following tensile strength in kilograms per square centimeter:

|  | 7 Days. | 28 Days. |
|---|---|---|
| Water-hardened | 0 | 0 |
| Air-hardened | 3.9 Kg. | 10. Kg. |

The same slag was treated with air for a longer time and was slowly cooled down. The resulting material when ground and moistened set within twenty-four hours. This material when made into test-pieces in the ordinary way with three parts of sand gave the following strength in kilograms per square centimeter:

|  | 7 Days. | 28 Days. |
|---|---|---|
| Water-hardened | 3.6 Kg. | 6.04 Kg. |
| Air-hardened | 6.6 Kg. | 27.5 Kg. |

The two last-named materials when ground and mixed in about the same proportions produced a cementitious material which set within four hours. It gave the following tensile strength in kilograms per square centimeter when tested as usual with three parts of sand:

|  | 7 Days. | 28 Days. |
|---|---|---|
| Water-hardened | 12.8 Kg. | 20.1 Kg. |
| Air-hardened | 24. Kg. | 32.7 Kg. |

The samples of slag material used in the tests last mentioned were not absolutely pure. The vitreous material seemed to contain slight traces of pumiceous, and the pumiceous material seemed to contain small quantities of the vitreous modification, which probably explains the fact that each of these slag materials when ground possessed the slight tensile strength indicated. These slag materials cannot, however, be properly considered as cement when used alone. The active and inert modifications must be mixed in substantial proportions to produce a good cement.

As previously mentioned, it has sometimes proved advantageous to add a small quantity of ordinary Portland cement in order to increase the initial strength of the product and to regulate the time of setting. An excellent cement was produced by mixing equal parts of vitreous slag material and of pumiceous slag material when ground and adding ten per cent. of ordinary Portland cement. This cement when tested in the usual way with three parts of sand to one of cement gave the following results in kilograms per square centimeter:

*Tensile Tests.*

|  | 3 Days. | 7 Days. | 28 Days. | 3 Months. |
|---|---|---|---|---|
| Water-hardened | 12.6 Kg. | 15.5 Kg. | 26.3 Kg. | 31.7 Kg. |
| Air-hardened | 20.2 Kg. | 19.1 Kg. | 22.2 Kg. | 44.9 Kg. |

*Compression Tests.*

|  | 7 Days. | 28 Days. |
|---|---|---|
| Water-hardened | 168.5 Kg. | 232 Kg. |
| Air-hardened | 166.5 Kg. | 268 Kg. |

It has been found that great quantities of furnace-slag exist which do not have the same composition as ordinary Portland cement, but which when treated with air and mixed in the manner indicated produce a valuable cementitious material.

It has been pointed out that the mixture of the two kinds of treated slag does not result in a useful cement when only traces of one or the other is present in the mixture and that to obtain a highly-cementitious material suitable proportions of both must be used, and examples have been given in which the two kinds of treated slag are mixed in about equal proportions. I do not, however, restrict myself to these proportions, as it is obvious that the desired result may be obtained by varying somewhat therefrom.

It is of course understood that those familiar with this art may make many variations in this process and the resulting product, and apparatus of various forms may of course be employed without departing from the spirit of this invention or losing the advantages of the same.

What I claim as new and what I desire to secure by Letters Patent is set forth in the appended claims:

1. The cement process which consists in heating water-granulated furnace-slag to substantially 1,200° centigrade and quickly cooling the same to produce active material, in drying water-granulated furnace-slag to produce inert material and in mixing substantial proportions of said active and inert materials to produce a highly-cementitious material.

2. The cement process which consists in roasting water-granulated furnace-slag and cooling the same to produce active cement material, in drying water-granulated furnace-slag to produce inert cement material and in mixing substantial proportions of said active and inert materials to produce a highly-cementitious material.

3. The cement process which consists in mixing substantial proportions of active furnace-slag material, giving when ground, moistened and treated with carbon dioxid a considerable rise of temperature, and of inert furnace-slag material, giving when ground, moistened and treated with carbon dioxid only an inconsiderable rise of temperature.

4. The cement process which consists in mixing substantial proportions of active furnace-slag material, giving when ground, moistened and treated with carbon dioxid a considerable rise of temperature, and of inert furnace-slag material, giving when ground, moistened and treated with carbon dioxid only an inconsiderable rise of temperature; and in adding Portland cement.

5. The cement process which consists in mixing substantial proportions of active furnace-slag material, giving when ground, moistened and treated with carbon dioxid a considerable rise of temperature, and of inert furnace-slag material, giving when ground, moistened and treated with carbon dioxid only an inconsiderable rise of temperature; and in adding independently-cementitious material.

6. The cement process which consists in roasting and cooling water-granulated furnace-slag to produce active material, in separately treating furnace-slag to produce inert material and in subsequently mixing substantial proportions of said active and inert materials to produce a highly-cementitious material.

7. The cement process which consists in treating furnace-slag to produce active material, in separately treating furnace-slag to produce inert material and in subsequently mixing substantial proportions of said active and inert materials to produce a highly-cementitious material.

8. The cement process which consists in heating and cooling furnace-slag to produce active material, in separately treating furnace-slag to produce inert material, in subsequently mixing substantial proportions of said active material and said inert material and in adding Portland cement.

9. The cement process which consists in mixing highly-cementitious material having substantially the same chemical composition as furnace-slag, formed from said slag without the addition of other materials; and Portland cement.

10. The cement process which consists in mixing highly-cementitious material having substantially the same chemical composition as furnace-slag, formed from said slag without the addition of other materials; and independently-cementitious material.

11. The cement process which consists in heating water-granulated furnace-slag to substantially 1,200° centigrade, and in cooling the same so that said treated slag, gives when ground, moistened and treated with carbon dioxid a considerable rise of temperature, lacks without the addition of other materials highly-cementitious properties, and forms when mixed with dried water-granulated furnace-slag a highly-cementitious material.

12. The cement process which consists in bringing furnace-slag to a highly-heated condition, and in cooling the same so that said treated slag, gives when ground, moistened and treated with carbon dioxid a considerable rise of temperature, lacks without the addition of other materials highly-cementitious properties and forms when mixed with dried water-granulated furnace-slag a highly-cementitious material.

13. The active cement material, produced from furnace-slag by treating said slag at high temperature to convert the same, lacking without the addition of other materials highly-cementitious properties, forming when mixed with dried water-granulated furnace-slag a highly-cementitious material, and giving when ground, moistened and treated with carbon dioxid a considerable rise of temperature.

14. The active cement material, having substantially the chemical composition of water-granulated furnace-slag, lacking without the addition of other materials highly-cementitious properties, forming when mixed with dried water-granulated furnace-slag a highly-cementitious material, and giving when ground, moistened and treated with carbon dioxid a considerable rise of temperature, produced from said water-granulated furnace-slag without the addition of other materials.

15. The active cement material, having substantially the chemical composition of furnace-slag containing considerably less lime than Portland cement, formed from said slag, lacking without the addition of other materials highly-cementitious properties, forming when mixed with dried water-granulated slag a highly-cementitious material, and giving when ground, moistened and treated with carbon dioxid a considerable rise of temperature.

16. The cement comprising substantial proportions of furnace-slag highly heated and cooled to form active material giving a considerable rise of temperature when ground, moistened and treated with carbon dioxid, and of furnace-slag treated to form inert material giving only an inconsiderable rise of temperature when ground, moistened and treated with carbon dioxid, and an addition of Portland cement.

17. The cement comprising substantial proportions of furnace-slag treated to form active material giving a considerable rise of temperature when ground, moistened and treated with carbon dioxid, and of furnace-slag treated to form inert material giving only an inconsiderable rise of temperature when ground, moistened and treated with carbon dioxid, and an admixture of independently-cementitious material.

18. The cement comprising highly-cementitious material having substantially the same chemical composition as furnace-slag, formed from said slag without the addition of other materials; and Portland cement.

19. The cement comprising highly-cementitious material having substantially the same chemical composition as furnace-slag, formed from said slag without the addition of other materials; and independently-cementitious material.

20. The highly-cementitious material comprising substantial proportions of water-granulated furnace-slag roasted and cooled to form active material giving a considerable rise of temperature when ground, moistened and treated with carbon dioxid, and of furnace-slag treated to form inert material giving only an inconsiderable rise of temperature when ground, moistened and treated with carbon dioxid.

21. The highly-cementitious material formed of a mixture of substantial proportions of active furnace-slag material giving a considerable rise of temperature when ground, moistened and treated with carbon dioxid formed by treating furnace-slag at high temperature to convert the same, and of inert furnace-slag material giving only an inconsiderable rise of temperature when ground, moistened and treated with carbon dioxid.

22. The highly-cementitious material formed of a mixture of substantial proportions of active furnace-slag material giving a considerable rise of temperature when ground, moistened and treated with carbon dioxid, and of inert furnace-slag material giving only an inconsiderable rise of temperature when ground, moistened and treated with carbon dioxid.

In testimony whereof I have signed my name to this specification in the presence of two subscribing witnesses.

HERMANN PASSOW.

Witnesses:
E. H. L. MUMMENHOFF,
T. CHRIST. HAFERMANN.